(12) United States Patent
Frias et al.

(10) Patent No.: US 7,768,148 B2
(45) Date of Patent: Aug. 3, 2010

(54) ANTI-THEFT BATTERY SWITCH BOX SYSTEM

(76) Inventors: Ronny Frias, 11282 Telfair Ave., San Fernando, CA (US) 91340; Raul Frias, Jr., 11282 Telfair Ave., San Fernando, CA (US) 91340

( * ) Notice: Subject to any disclaimer, the term of this patent is extended or adjusted under 35 U.S.C. 154(b) by 348 days.

(21) Appl. No.: 11/873,964

(22) Filed: Oct. 17, 2007

(65) Prior Publication Data

US 2009/0101484 A1   Apr. 23, 2009

(51) Int. Cl.
*B60R 25/00* (2006.01)
(52) U.S. Cl. ..................................... 307/10.2
(58) Field of Classification Search ................ 307/10.2
See application file for complete search history.

(56) References Cited

U.S. PATENT DOCUMENTS

| | | | |
|---|---|---|---|
| 3,802,233 A | 4/1974 | Riley | |
| 3,821,501 A | 6/1974 | Parmenter | |
| 5,170,151 A | 12/1992 | Hochstein | |
| 5,401,924 A | 3/1995 | Armanno, Sr. | |
| 5,813,655 A * | 9/1998 | Pinchott et al. | 251/129.04 |
| D402,633 S | 12/1998 | Wirth | |
| 5,938,655 A * | 8/1999 | Bisch et al. | 606/1 |
| 6,265,787 B1 * | 7/2001 | Downey | 307/10.2 |

\* cited by examiner

*Primary Examiner*—Robert L. Deberadinis
(74) *Attorney, Agent, or Firm*—Advantia Law Group; Michael W. Starkweather

(57) ABSTRACT

An anti-theft battery switchbox system, comprising: an ignition coil; a cutoff switch electrically connected to the ignition coil; a battery in electrical communication with the cutoff switch; and the cutoff switch selectively electrically couples the battery to the ignition coil. A remote control module in wireless communication with the cutoff switch controls the cutoff switch between an on mode and an off mode. The remote control module includes an actuator configured to permit a user to change between on/off modes. In addition, the actuator is not actuatable by a single linear impulse. The wireless communication between the remote control module and the cutoff switch comprises a unique signal feature. The unique signal feature includes a signal feature from the group of signal features consisting of frequency, amplitude modulation, frequency modulation, and signal key. The unique signal feature comprises a unique frequency and wherein the actuator comprises a knob.

1 Claim, 3 Drawing Sheets

ANTI-THEFT BATTERY SWITCH BOX SYSTEM

BACKGROUND OF THE INVENTION

1. Field of the Invention

The present invention relates to a remote control security system, specifically an anti-theft battery switch box.

2. Description of the Related Art

In the related art, it has been known to use devices to remotely and/or proximately control the electrical systems of vehicles to allow and disallow vehicle operation at will. It is know that vehicles require battery power as a part of the ignition process to begin the combustion cycle of the engine. In most modern vehicles if such battery power is not sufficient or non-existent the vehicle cannot be operated. It is know that there are many cars stolen each year. Such cars are stolen despite various alarms and/or lack of proper key to initiate the ignition process. Therefore there is a need for a device that safely, securely, and easily prevents a vehicle from being operated by unauthorized persons. Some improvements have been made in the field. Examples include but are not limited to the references described below, which references are incorporated by reference herein:

U.S. Pat. No. 3,821,501, issued to Parmenter, discloses a battery disconnecter particularly adapted for disconnecting the batteries of automobiles to prevent theft comprising a remote operated rotary switch. Having two fixed contacts, one to one of the cables of the battery, and the other preferably between the battery and the electric starting motor. A rotatable connector is adapted to carry the current between these contacts and is turned by a gear in turn operated by pinion gear connected to a rotary shaft or the like which may be either locked by a key or have an operating handle hidden in a n unexposed portion of the vehicle, e.g., under the dashboard.

U.S. Pat. No. 5,401,924, issued to Armanno, Sr., discloses a remote battery switch for motor vehicles that provides for the remotely controlled disconnection and connection of the vehicle electrical system, for long term storage or carjacking threats. The switch attaches directly to the side terminal or top post connector of a standard motor vehicle battery, without further need for additional structural attachment. A cord or cable is run from the battery switch to the vehicle passenger interior, and is preferably discreetly accessible by the vehicle operator should the need arise. The cord or cable serves to open the switch by releasing a magnetic contact and withdrawing the magnetic switch bar against a spring, whereupon the switch bar is caught and retained by a double acting catch. A second pull on the cord releases the catch, whereupon the spring pulls the magnetic switch bar into magnetic contact with the other switch point to close the circuit. Thus, the switch may be remotely opened and closed using purely tensile forces in the cord.

U.S. Pat. No. 5,170,151, issued to Hochstien, discloses a battery disconnect circuit that is shown for disconnecting a battery from an electrical load. A voltage measuring circuit constantly measures the voltage of the battery. When the voltage reaches a predetermined voltage, proportional to the stored electrochemical energy sufficient to start a vehicle one time, a circuit breaker disconnects the battery. An inhibitor senses the operation of the engine through an electret microphone and inhibits the circuit breaker from opening. An alarm disabler senses the states of the circuit breaker, i.e., whether the circuit breaker is open or closed, and disables the alarm if the circuit breaker is closed. A trigger through a sensor sensing a drop in voltage due to an operator trying to activate the starting subsystem activates the alarm to notify the operator that the battery has been disconnected. The activation of the alarm only occurs in the presence of the operator.

U.S. Pat. No. 6,265,787, issued to Downey, discloses a vehicle anti-theft system for permitting a user to electively disable an ignition coil of a vehicle so that the vehicle cannot be started unless reactivated by the user. The vehicle anti-theft system includes a distributor, an ignition coil electrically connected to the distributor, and a battery electrically connected to the ignition coil to provide electrical energy to the ignition coil. A cutoff switch is electrically connected between the battery and the ignition coil to selectively provide electrical power to the ignition coil. A remote controller has a transmitter for transmitting a signal. The cutoff switch has a receiver for receiving the signal from the remote controller. The cutoff switch precludes the supply of energy to the ignition coil from the battery upon receipt of a first signal from the remote controller. The cutoff switch allows the supply of energy to the ignition coil from the battery upon receipt of a second signal from the remote controller subsequent to receipt of the first signal.

U.S. Pat. No. 3,802,233, issued to Riley, discloses a vehicle theft prevention system for locking the hood of a motor vehicle while simultaneously disconnecting the vehicle battery from the vehicle electrical circuitry. A locking shaft member is movable by insertion of a key in a lock mounted on a vehicle hood. A plate member mounted on the shaft prevents the vehicle hood from being raised when the shaft is in a first position, and enables the hood to be raised when the shaft is moved to a second position. An electrical switch armature is mounted on a second shaft for disconnecting the vehicle battery from the vehicle electrical circuitry when the shaft is in the first position and connecting the vehicle battery to the vehicle electrical circuitry when the shaft is in a second position. The electrical switch armature interconnects a pair of terminal members formed of flared spring fingers which provide an interconnection between portions of the battery cable when it is desired to operate the vehicle. The first and second shafts are gauged to rotate together by a separable interconnection for enabling the hood to be raised when the vehicle engine is running.

U.S. Design Pat. No. 402,633, issued to Wirth, discloses an ornamental design for a battery disconnect switch.

The inventions heretofore known suffer from a number of disadvantages which include expensive, unduly complex, limited use, limited versatility, difficult to use/install, unreliable, unsafe and/or fails to provide a convenient, secure, and/or simple means for enabling and disabling a vehicles electrical system remotely to prevent unauthorized use of the vehicle.

What is needed is an anti-theft battery switch box that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available anti-theft battery switch box. Accordingly, the present invention has been developed to provide an anti-theft device to disconnect the battery to prevent the operation of the vehicle.

There is one embodiment of an anti-theft battery switch box system to provide a car disabling security system. The anti-theft battery switch box includes: an ignition coil; a cutoff switch that may be electrically connected to the ignition coil; a battery that may be in electrical communication with the cutoff switch. The cutoff switch may be selectively electrically coupled to the battery and/or to the ignition coil. A remote control module that may be in wireless communication with the cutoff switch, wherein the remote controller may control the cutoff switch between an on mode and an off mode. The remote control module may further include an actuator that may be configured to permit a user to change between an on mode and an off mode. The actuator may not be actuatable by a single linear impulse. The wireless communication between the remote control module and the cutoff switch may comprise a unique signal feature. Wherein the unique signal feature may include a signal feature from the group of signal features consisting of frequency, amplitude modulation, frequency modulation, and signal key. The unique signal feature may also comprise a unique frequency and wherein the actuator may further comprise a knob.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
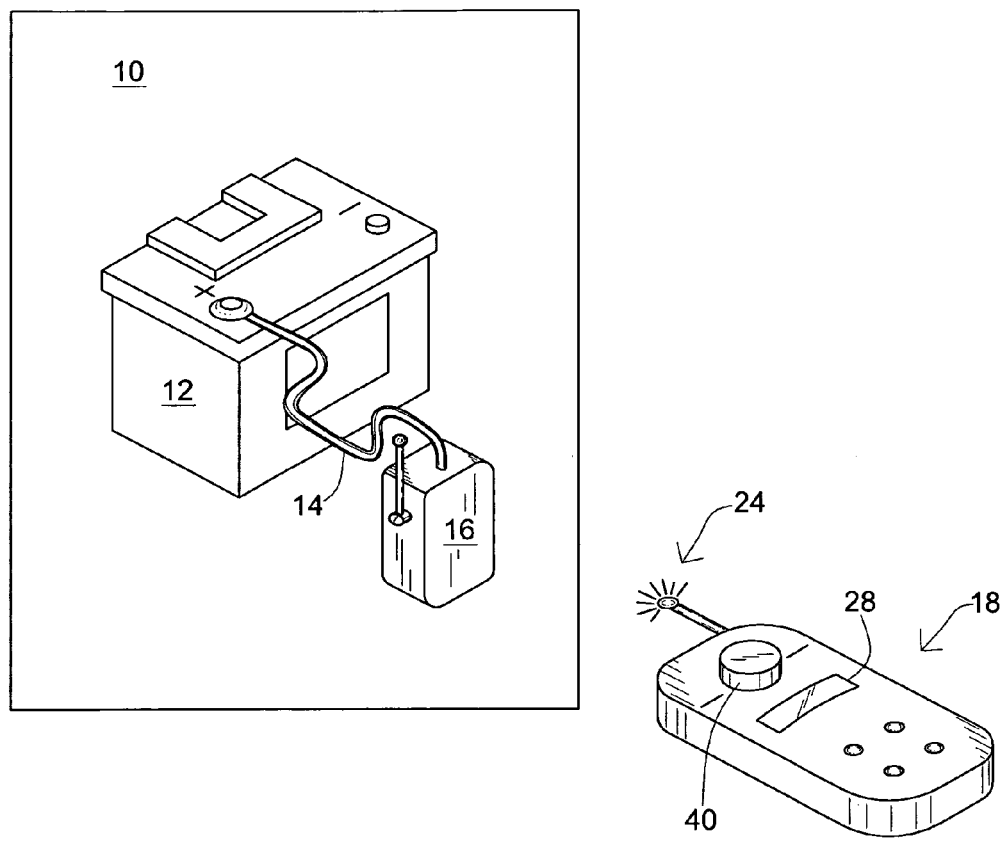
FIG. 1 illustrates; a perspective view of a vehicle security device, according to one embodiment of the invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

As used herein, "comprising," "including," "containing," "is", "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

Figure 2:
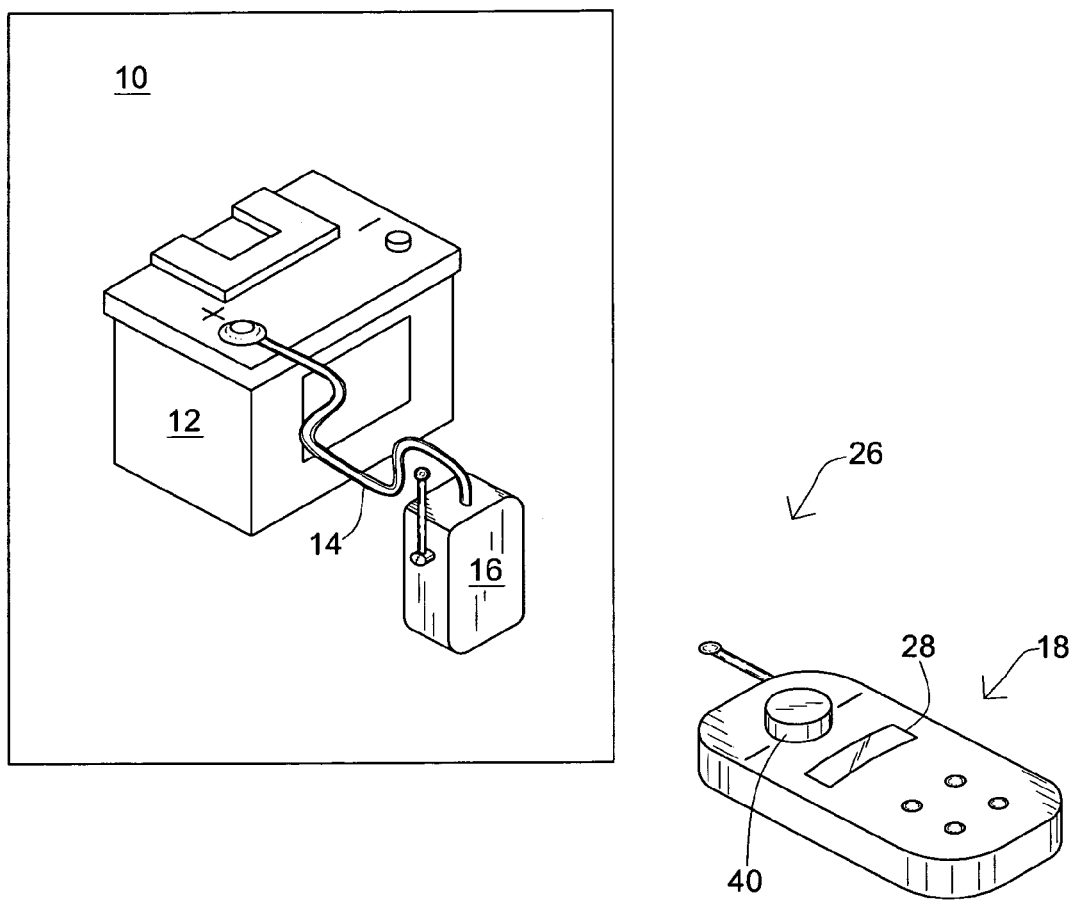
FIG. 2 illustrates; a perspective view of a vehicle security device, according to one embodiment of the invention.
Figure 3:
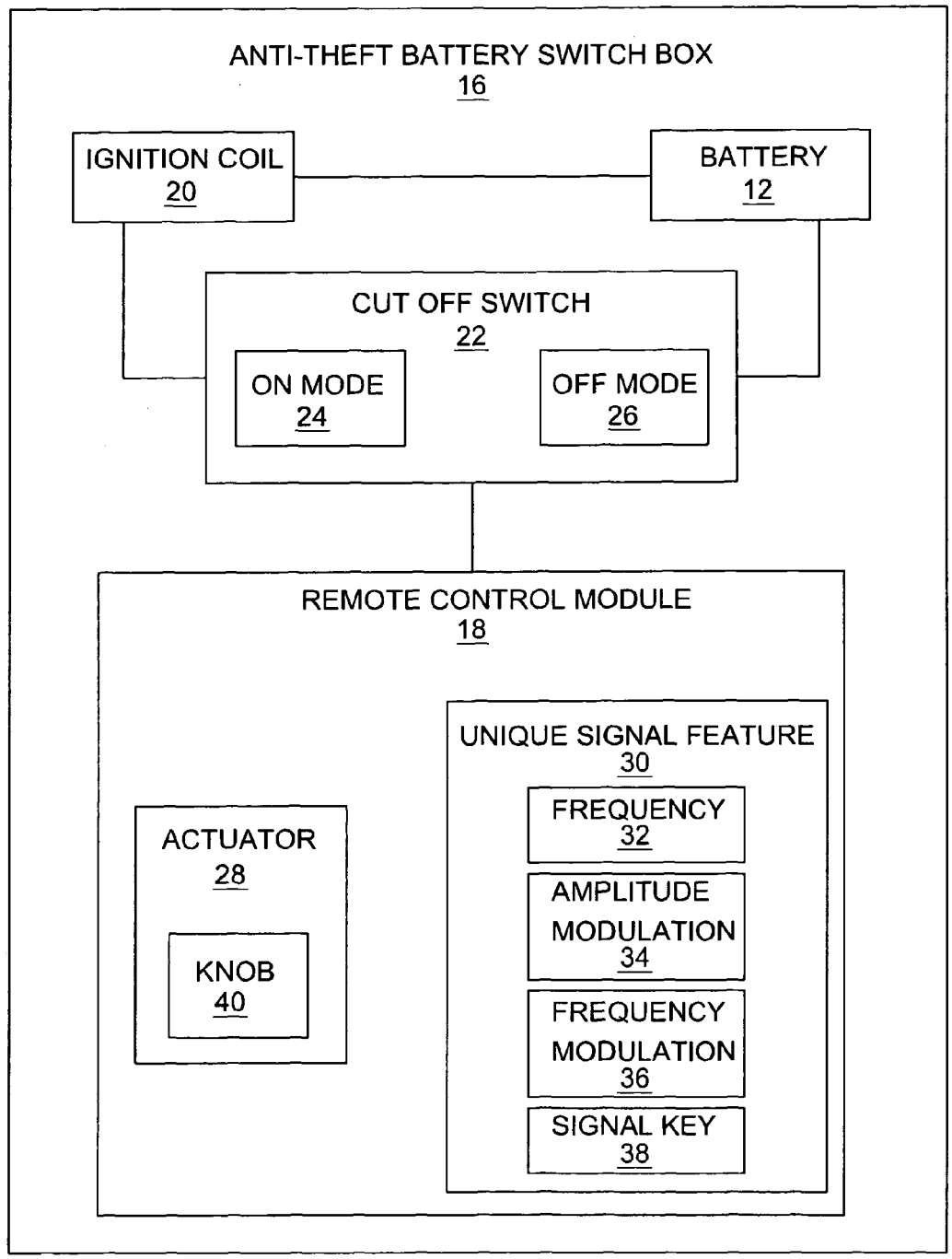
FIG. 3 illustrates; block diagram of a vehicle security device, according to one embodiment of the invention.

FIGS. 1 and 2 illustrate an anti-theft battery switch box 16 serving as a security system for a user to disable a motor vehicle 10, thereby reducing theft of the motor vehicle 10 when unattended. The anti-theft battery switch box 16 comprises an ignition coil 20, such as an inductor, and an electrical cutoff switch 22, such as is a Mr. Gasket battery cutoff switch manufactured by Mr. Gasket Inc., 10601 Memphis Ave Building 12, Cleveland, Ohio, 44144. The cutoff switch 22 is electrically coupled to the ignition coil 20 and the car battery 12, such as an Optima 34M-1050 battery manufactured by Battery Service Corporation, 410 Evergreen Ave., Bensenville, Ill, 60106. The cutoff switch 22 is selectively electrically coupled to the battery 12 and the ignition coil 20, and configured to break an electrical circuit in order to cut off power delivered from the battery 12 to the ignition coil 20, as a means to disable the ignition of the motor vehicle 10.

According to one embodiment of the invention, there is a remote control module 18, such as a Biene Remote 16GM manufactured by Biene Electronics, Rusonu, 24/1-53 Riga, LV-1057, Latvia, that is in wireless communication with the cutoff switch 22, and configured to remotely control the cutoff switch 22 between an "on" mode 24, as shown in FIG. 1 and an "off" mode 26, as shown in FIG. 2. If the cutoff switch 22 is in the "on" mode 24, then no electrical power can be delivered through the positive battery cable 14 to the ignition coil 20; thereby inhibiting the user from manipulating the ignition to start the motor vehicle. The remote control module 18 further includes an actuator 28, such as an electrical actuator manufactured by Bernard Controls Inc. 15740 Park Row Suite 100, Houston, Tex. 77084. A user may manipulate the actuator 28 to permit a user to change between an "on" mode 24 and an "off" mode 26. Moreover, the actuator 28 is not actuatable by a single linear impulse; thereby serving as a means to prevent the user from activating the switch box accidentally.

According to another embodiment of the invention, the wireless communication between the remote control module 18 and the cutoff switch 22 comprises a unique signal feature 30. The unique signal feature 30 includes a signal feature from the group of signal features consisting of frequency 32, amplitude modulation 34, frequency modulation 36, and a signal key 38. The unique signal feature uses all three features in the group to comprise a unique signal to communicate with the specified cutoff switch. Frequency 32 is a measurement of the number of occurrences of a function per unit time; the frequency 32 wave is usually in the form of a sine function. Amplitude modulation 34 represents transmitted data by varying the amplitude of a fixed-frequency carrier of designated frequency 32. Frequency modulation 36 significantly reduces the sensitivity to amplitude errors in the signal path, making it easier for subsequent processing circuitry to detect the frequency 32 of the signal. Information can be encoded in the frequency 32 of the sine wave being sent, so that signal attenuation or other amplitude based disturbances would not tend to corrupt the recovered data. By composing a unique signal feature that can vary in frequency 32, amplitude modulation 34, frequency modulation 36, and a signal key 38; the user can establish a unique signal key that will not be corrupted or interrupted during use.

In yet another embodiment of the invention the unique signal feature 30 further comprises a unique frequency 42. The unique signal feature contains a unique signal that only signals the specified cutoff switch. The unique frequency 42 is a secondary security function that prohibits other users from using other remote control frequencies to communicate with the switch box.

In still yet another embodiment of the invention the actuator 28 further comprises a knob 40. The knob 40 allows a user to switch the remote control between the "on" mode 24 and an "off" mode 26.

In operation, the user may install the cutoff switch 22 between the battery 12 and the ignition coil 20 in the motor vehicle 10. To activate the cutoff switch 22 as a means to disable the ignition of the motor vehicle 10, the knob 40 of the actuator 28 in the remote control module 18 is selected to the "on" mode 24. In the "on" mode 24, the remote control module 18 signals the switch box 16 through a plurality of unique signal features 30 to activate the cutoff switch 22, thereby disconnecting the battery 12 from the ignition coil 20. To deactivate the cutoff switch 22, the knob 40 is adjusted to the "off" mode 26, thereby allowing the battery 12 to electrically communicate with the ignition coil 20 to allow the user to start the ignition of the motor vehicle 10.

Benefits of using or manufacturing of the invention include being able to provide a convenient and effective device to protect a motor vehicle from being stolen, that is also reliable and inexpensive to manufacture.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claim rather than by the foregoing description. All changes which come within the meaning and range of equivalency of the claims are to be embraced within their scope.

Although the figure illustrates the remote control module 18 communicating a signal to the switch box 16 from an exterior to the motor vehicle 10, it is envisioned that the remote control module 18 can communicate with the switch box 16 from an interior of the motor vehicle 10.

It is envisioned that one skilled in the art would appreciate that the actuator 28 and knob 40, located on the remote control module 18 may be displaced anywhere on the remote control module 18. Furthermore, the positive battery cable may be displaced anywhere on the battery 12.

It is also envisioned that the anti-theft battery switch box 16 can be employed with a variety of different vehicle makes and models. Examples such as motorcycles, dump trucks, or school buses.

It is expected that there could be numerous variations of the design of this invention. An example is that the motor vehicle 10, battery 12, positive battery cable 14, anti-theft battery switch box 16, remote control module 18, ignition coil 20, cutoff switch 22, actuator 28, and knob 40 may be embodied in various sizes, shapes, lengths, widths, designs, color, etc.

Finally, it is envisioned that the components of the device may be constructed of a variety of materials, such as metals, metal alloys, aluminum, etc.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. An anti-theft battery switchbox system; comprising:
   a) an ignition coil;
   b) a cutoff switch electrically connected to the ignition coil;
   c) a battery in electrical communication with the cutoff switch, wherein the cutoff switch selectively electrically couples the battery to the ignition coil;
   d) a remote control module in wireless communication with the cutoff switch, wherein the remote controller controls the cutoff switch between an on mode and an off mode;

and wherein the remote control module includes an actuator configured to permit a user to change between an on mode and an off mode, wherein the actuator is not actuatable by a single linear impulse;

wherein the wireless communication between the remote control module and the cutoff switch comprises a unique signal feature;

wherein the unique signal feature includes a signal feature from the group of signal features consisting of frequency, amplitude modulation; frequency modulation, and signal key; and wherein the unique signal feature comprises a unique frequency and wherein the actuator comprises a knob.

* * * * *